UNITED STATES PATENT OFFICE 2,107,000

ACID WOOL DYESTUFFS OF THE ANTHRAQUINONE SERIES

Richard Hilpert, Frankfort-on-the-Main-Hochst, Germany, assignor to General Aniline Works, Inc., New York, N. Y., a corporation of Delaware No Drawing. Application July 28, 1936, Serial No. 93,122. In Germany August 14, 1935

1 Claim. (Cl. 260—60)

The present invention relates to acid wool dyestuffs of the anthraquinone series.

I have found that it is possible to condense 2-amino-3,5-dichlorobenzoic acid with 1-amino-4-bromanthraquinone-2-sulfonic acid, the corresponding 1-amino-4-arylido-2-anthraquinonesulfonic acid being obtained with a technically satisfactory yield. It has the following formula:

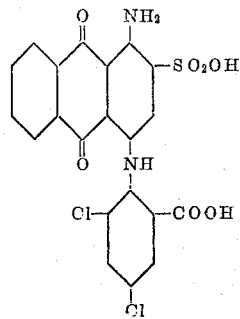

The practicability of this process is surprising. It could, for instance, not be foreseen whether the amino-group of the 2-amino-3,5-dichlorobenzoic acid would react with the bromine of the anthraquinone-sulfonic acid, since the capacity for reaction of the said amino-group is considerably impeded by the substituents in the two ortho-positions. The product, obtainable by the invention, dyes wool in an acid bath vivid blue tints of good fastness to light and to washing. It may be used as wool dyestuff or as an intermediate for the production of other dyestuffs.

The following examples serve to illustrate the invention, but they are not intended to limit it thereto; the parts are by weight:

(1) To a paste of 38.2 parts of 1-amino-4-bromanthraquinone-2-sulfonic acid in 200 parts of water is added a solution of 25 parts of dichloranthranilic acid; (obtainable, for instance, by splitting up 5,7-dichlorisatin with caustic soda solution and oxidizing by means of hydrogen peroxide) in 100 parts of water and 40 parts of sodium bicarbonate. After addition of 3.5 parts of cuprous chloride the whole is stirred for 9 hours at 75° to 80° C. After cooling, the whole is filtered at 40° C., then washed with a sodium chloride solution of 5 per cent. strength and the press cake obtained is transformed into a reddish-brown crystalline mass by boiling it with hydrochloric acid of 5 per cent. strength. The whole is filtered with suction; the press cake is again dissolved in dilute sodium carbonate solution, and this solution is acidified with hydrochloric acid, the suspension thus formed is boiled, filtered and dried. 28.6 parts of a pure condensation product are obtained.

(2) 42 parts of the dichloranthranilic acid referred to in Example 1 are dissolved, while heating, in 150 parts of water and 40 parts of sodium bicarbonate. 76.4 parts of 1-amino-4-bromanthraquinone-2-sulfonic acid which have been made into a paste with 200 parts of water are then added and the whole is heated to 70° to 75° C. 4.4 parts of solid cuprous chloride dissolved in 10 parts of concentrated hydrochloric acid are then added and the whole is stirred for 4 hours at 75° C., whereupon another 40 parts of sodium bicarbonate in solid form are added. Stirring is continued for 3 hours at 75° C.; the mass is then allowed to cool to 40° C. and worked up as indicated in Example 1. After drying, 64 parts of a pure condensation product are obtained.

I claim:

The members of the group consisting of the compound of the formula

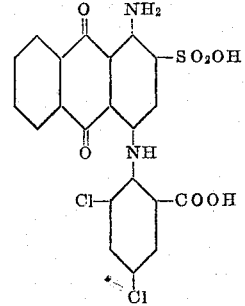

and the alkali metal salts thereof.

RICHARD HILPERT.